United States Patent
Adane et al.

(10) Patent No.: US 9,316,254 B2
(45) Date of Patent: Apr. 19, 2016

(54) CAGE FOR A BEARING, IN PARTICULAR FOR A BEARING OF AN ELECTRICAL STEERING SYSTEM OF A MOTOR VEHICLE

(71) Applicant: Aktiebolaget SKF, Göteborg (SE)

(72) Inventors: Thierry Adane, Tours (FR); Sylvain Bussit, Monnaie (FR); Jean-Marie Gerard, Joué-Lès-Tours (FR); Christopher Kern, Haβfurt (DE); Thomas Lepine, Villandry (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/319,625

(22) Filed: Jun. 30, 2014

(65) Prior Publication Data
US 2015/0003768 A1 Jan. 1, 2015

(30) Foreign Application Priority Data

Jun. 28, 2013 (FR) .................. 13 56277

(51) Int. Cl.
*F16C 33/41* (2006.01)
*F16C 33/38* (2006.01)
*F16C 19/06* (2006.01)

(52) U.S. Cl.
CPC ............. *F16C 33/3887* (2013.01); *F16C 19/06* (2013.01); *F16C 33/38* (2013.01); *F16C 33/414* (2013.01); *F16C 33/418* (2013.01); *F16C 2240/44* (2013.01); *F16C 2326/24* (2013.01)

(58) Field of Classification Search
CPC ...... F16C 19/06; F16C 33/38; F16C 33/3887; F16C 33/41; F16C 33/412; F16C 33/414; F16C 33/416; F16C 33/418; F16C 2240/44; F16C 2240/46; F16C 2326/24
See application file for complete search history.

(56) References Cited

U.S. PATENT DOCUMENTS

| 5,539,844 A * | 7/1996 | Tazumi et al. ............... 384/531 |
| 6,227,994 B1 * | 5/2001 | Niki et al. .................... 474/153 |
| 7,766,553 B2 * | 8/2010 | Nagai et al. .................. 384/523 |
| 2002/0006238 A1 * | 1/2002 | Kobayashi ............. F16C 19/06 384/523 |
| 2002/0037123 A1 | 3/2002 | Kobayashi |
| 2014/0016889 A1 * | 1/2014 | Adane et al. ................. 384/513 |
| 2014/0054102 A1 * | 2/2014 | Adane ................ F16C 33/3887 384/523 |

FOREIGN PATENT DOCUMENTS

| DE | 102007034091 | * | 1/2009 |
| EP | 2546536 A1 | | 1/2013 |
| FR | 2883941 A1 | | 10/2006 |
| FR | 2911934 A1 | | 8/2008 |
| FR | 2993332 A1 | | 1/2014 |
| FR | 2994722 A1 | | 2/2014 |
| JP | H0567817 U | | 9/1993 |
| WO | 2010032577 A1 | | 3/2010 |

* cited by examiner

*Primary Examiner* — James Pilkington
(74) *Attorney, Agent, or Firm* — Bryan Peckjian; SKF USA Inc. Patent Dept.

(57) ABSTRACT

The cage for a rolling bearing intended to ensure the circumferential spacing of a row of balls is provided. The cage provides at least two groups of pockets for the balls each provided with means for axially retaining the cage on the associated ball. A first range of axial play is provided between the pockets of a first of the at least two groups and associated balls. A second range of axial play is provided between the pockets of a second of the at least two groups and associated balls. The values of the ranges are different from each other.

14 Claims, 6 Drawing Sheets

FIG.4
FIG.5
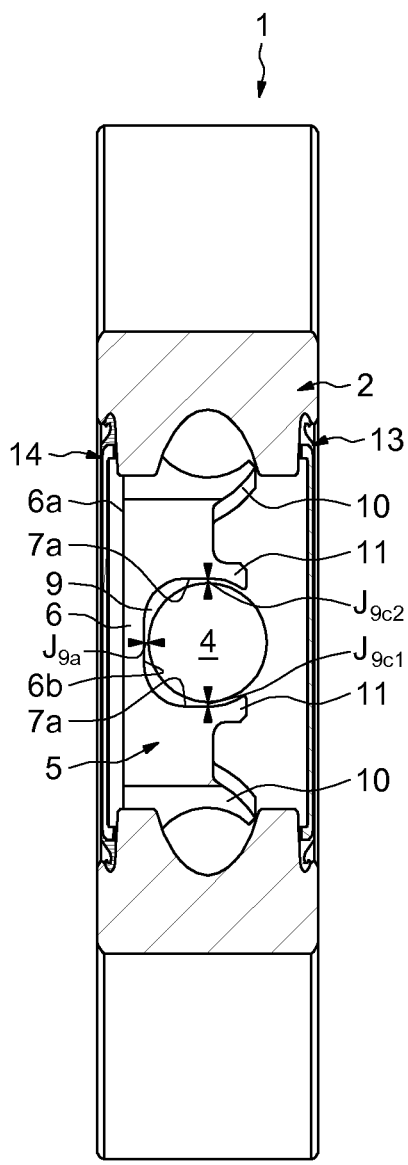
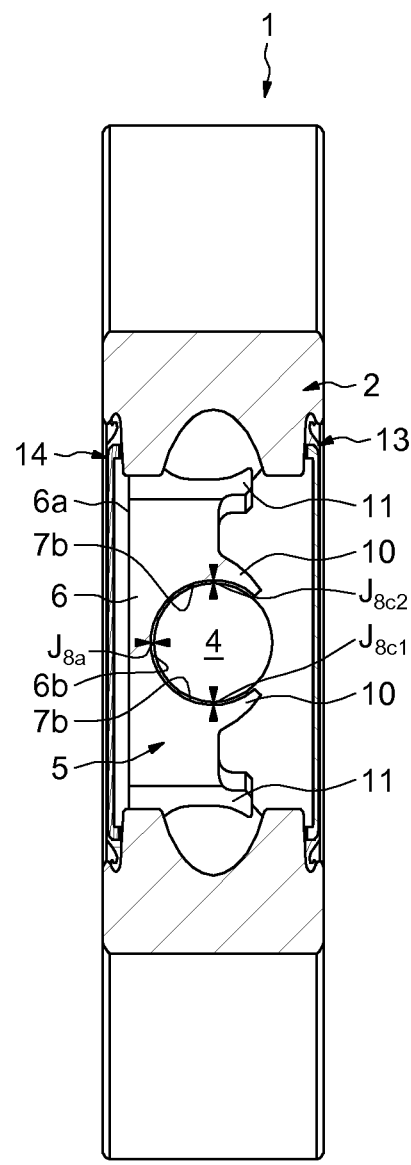

CAGE FOR A BEARING, IN PARTICULAR FOR A BEARING OF AN ELECTRICAL STEERING SYSTEM OF A MOTOR VEHICLE

CROSS-REFERENCE TO RELATED APPLICATIONS

This application claims priority to French Patent Application No. 1356277 filed on Jun. 28, 2013, the contents of which are herein fully incorporated by reference.

FIELD OF THE INVENTION

The present invention relates to the field of rolling bearings, in particular rolling bearings used in electrical steering systems of motor vehicles. More specifically, the invention relates to the retention cages which ensure circumferential spacing between the balls of the rolling bearings.

BACKGROUND OF THE INVENTION

An electrical steering system of a motor vehicle generally comprises an electromechanical actuator which is located on the steering column or on the lower assembly which comprises mechanical members which are intended to ensure the angular positioning of the guiding wheels of the vehicle. The electromechanical actuator comprises a rotational electric motor, whose shaft is supported by at least one rolling bearing, directly or via a system of ballscrews. The rolling bearing generally comprises an inner ring, an outer ring and a row of rolling elements, generally balls, which are arranged between the rings.

The document FR-A1-2 911 934 discloses a retention cage for a rolling bearing comprising a plurality of identical pockets for receiving balls, which pockets are each partially defined by two claws which are arranged opposite a projection of the cage. Such cages are completely satisfactory in a large number of applications. However, in applications at a low rotation speed or for which the direction of rotation is reversed abruptly, this type of cage involves various difficulties. This is because, under the effect of the balls, the cage may become powerfully deformed and come into contact with the inner ring, which causes damage thereto or the destruction thereof.

Furthermore, during a change in direction of the load applied to the rolling bearing, such as, for example, during the steering of the wheels of a vehicle provided with an electric steering system when the driver carries out maneuvers towards the left and towards the right in order to park the vehicle, the cage is also powerfully deformed, or destroyed, by the instantaneous increase in the torque.

The document FR-A1-2 883 941 also discloses a cage for a rolling bearing comprising first pockets which are provided with axial retention claws for the cage on the balls and second pockets which do not have retention claws.

With such a cage, there may be brought about an axial separation of the cage in relation to the balls.

SUMMARY OF THE INVENTION

An object of the present invention is to overcome these disadvantages. More specifically, an object of the present invention is to provide a cage for a rolling bearing having a good level of reliability of operation.

Another object of the present invention is to provide a cage which allows a limitation of the friction with the associated balls.

Another object of the present invention is to provide a cage which has a limited spatial requirement and which can be deformed to a small extent during operation.

In an embodiment, the cage for a rolling bearing, which cage is intended to ensure the circumferential spacing of a row of balls, comprises at least two groups of pockets for the balls each provided with means for axially retaining the cage on the associated ball. A first range of plays is provided between the pockets of the same group and the associated balls. A second range of plays is provided between the pockets of the other group and the associated balls. The values of the ranges are different from each other.

The first range of plays is preferably between 1% and 2.6% of the diameter of the ball, and in particular between 1.5% and 2.3% of the diameter. Advantageously, the plays may be 2% of the diameter of the ball.

The second range of plays is preferably between 2.7% and 5% of the diameter of the ball, and in particular between 3.05% and 4.2% of the diameter. Advantageously, the plays may be 3.4% of the diameter of the ball.

The pockets of each group are preferably identical to each other and different from the pockets of the other group.

In an embodiment, each pocket of one of the groups is separated from another pocket of the group by a pocket of the other group.

In an embodiment, the pockets of one of the groups are spherical and the pockets of the other group are cylindrical. In another embodiment, the pockets of the two groups are of identical form, in particular cylindrical or spherical. Alternatively, the spherical pockets could be replaced by pockets of ellipsoidal form.

Advantageously, the cage comprises an annular projection and separation portions which extend from the projection and which together delimit the pockets of the two groups. The separation portions may each comprise two claws which each extend in the circumferential direction in the direction of one of the claws of the adjacent separation portion.

The cage may, for example, be produced in a single piece from synthetic material, preferably polymer material.

According to a second aspect, the invention relates to a rolling bearing which comprises an outer ring, an inner ring, at least one row of balls arranged between the rings and a cage as defined above.

In an embodiment, the inner and outer rings each comprise two rolling raceways in order to form a four-point contact bearing.

According to a third aspect, the invention relates to an electrical steering system for a motor vehicle comprising at least one rolling bearing as defined above.

BRIEF DESCRIPTION OF THE DRAWINGS

The present invention will be better understood from a reading of the detailed description of embodiments taken by way of non-limiting examples illustrated by the appended drawings, in which:

FIGS. 2 to 5 are cross-sections along the axes II-II, III-III, IV-IV and V-V of FIG. 1, respectively.

DETAILED DESCRIPTION OF THE INVENTION

Figure 1:
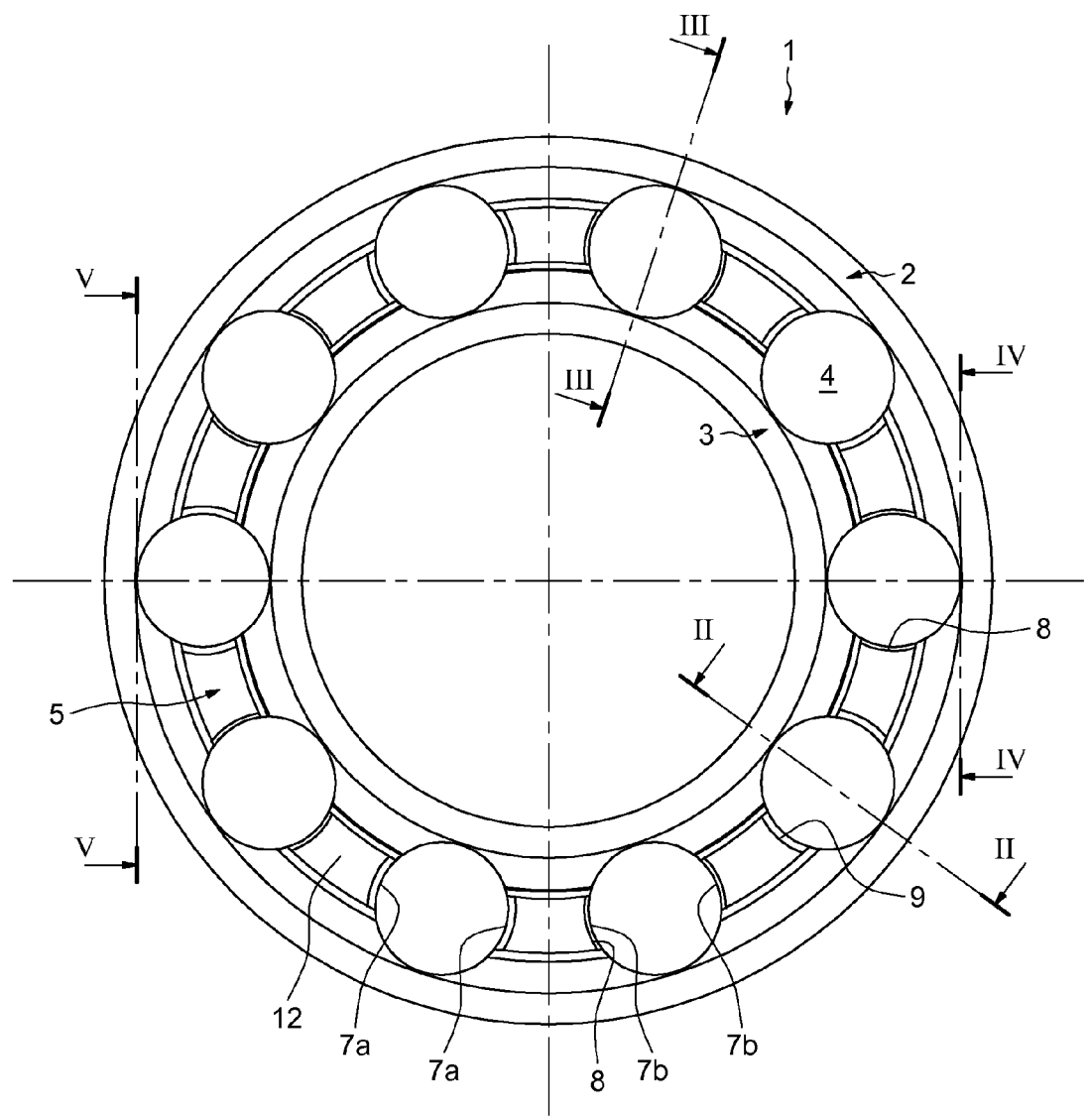
FIG. 1 is an axial cross-section of a rolling bearing according to a first embodiment of the invention.
Figure 2:
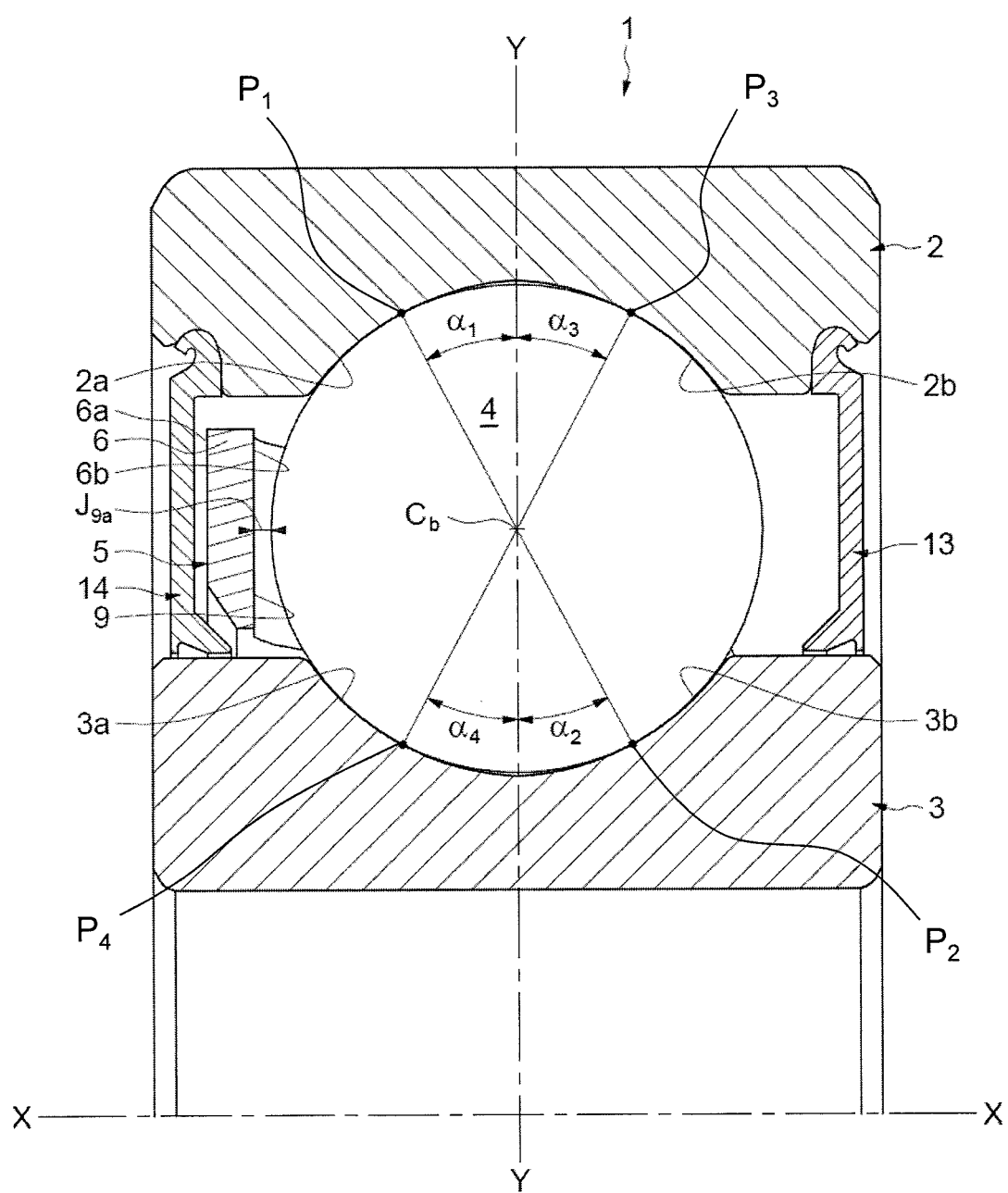
Figure 3:
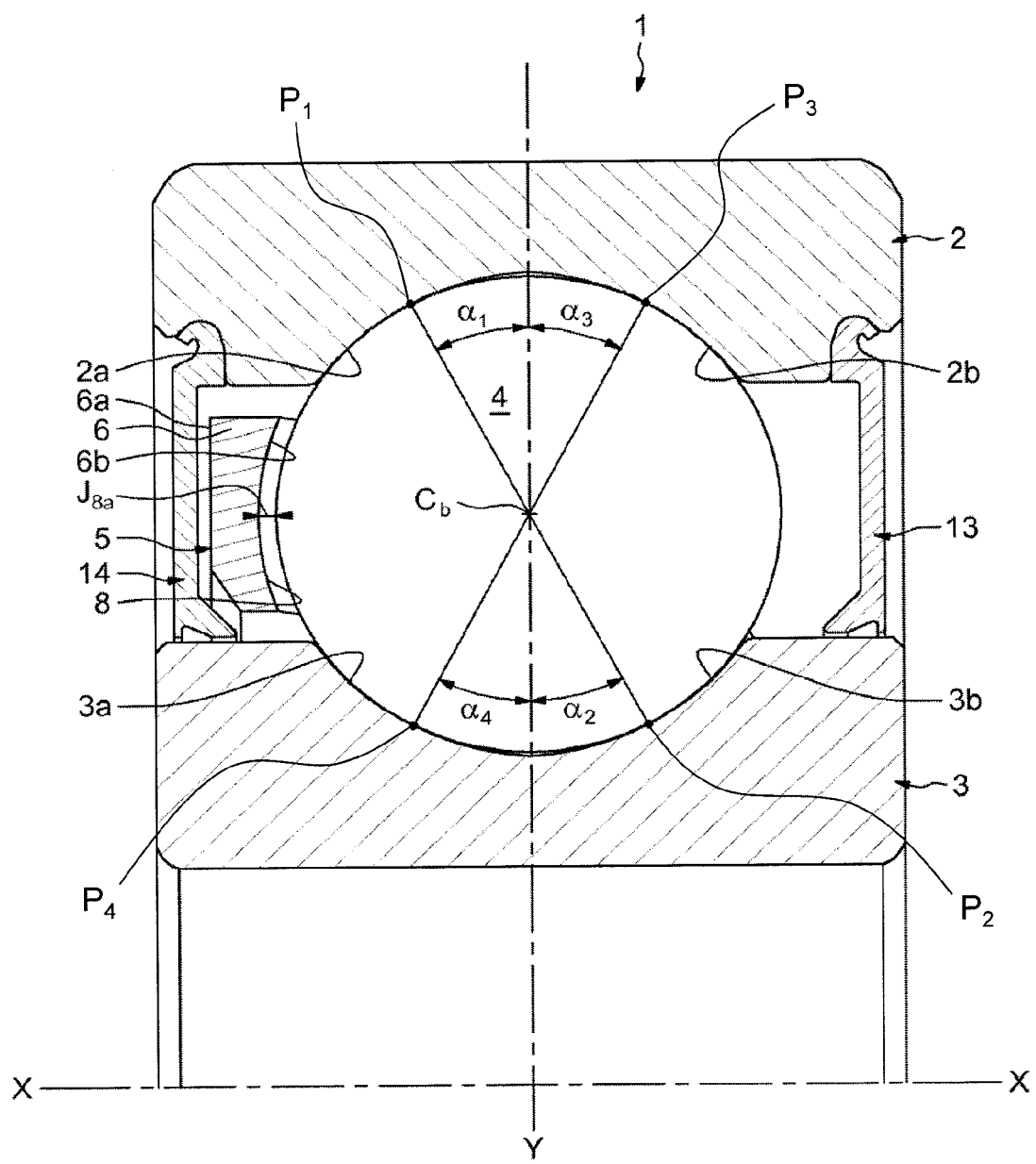

As illustrated in FIGS. 1 to 5, the rolling bearing 1 having an axis X-X comprises an outer ring 2, an inner ring 3, a plurality of rolling elements which are in the form of balls 4 which are of identical size and which are arranged between the rings, and a cage 5 which is for maintaining the regular circumferential spacing of the balls and which is arranged radially between the outer surface of the inner ring 3 and the hole of the outer ring 2. The outer ring 2 and inner ring 3 are solid. The term "solid ring" is intended to be understood to be a ring whose form is obtained by machining with removal of swarf (turning, grinding) from tubes, bars, and forged and rolled blanks.

The outer ring 2 comprises, in the region of its hole, two toroidal rolling raceways 2a, 2b which each have in cross-section a concave internal profile which is adapted to the balls 4, the rolling raceways being directed radially inwards. The inner ring 3 also comprises in the region of its outer cylindrical surface two toroidal rolling raceways 3a, 3b which each have in cross-section a concave internal profile which is adapted to the balls 4, the rolling raceways being directed radially outwards.

Each ball 4 is in contact with the four rolling raceways 2a, 2b, 3a, 3b which are formed on the inner ring 3 and outer ring 2. The straight line which extends on the one hand via a first contact location $P_1$ between the ball 4 being considered and a first rolling raceway 2a of the outer ring 2 and which extends, on the other hand, through the centre $C_b$ of the ball forms a first angle $\alpha_1$ in relation to a radial axis of symmetry Y-Y of the bearing which extends through the centre of the balls 4. The straight line which extends via a second contact location $P_2$ between the ball 4 being considered and a first rolling raceway 3b of the inner ring 3 and which extends through the centre $C_b$ of the ball forms a second angle $\alpha_2$ in relation to the axis of symmetry Y-Y. The straight line which extends via a third contact location $P_3$ between the ball 4 being considered and a second rolling raceway 2b of the outer ring 2 and which extends through the centre $C_b$ of the ball forms a third angle $\alpha_3$ in relation to the axis of symmetry Y-Y. The straight line which extends via a fourth contact location $P_4$ between the ball 4 being considered and a second rolling raceway 3a of the inner ring 3 and which extends through the centre $C_b$ of the ball forms a fourth angle $\alpha_4$ in relation to the axis of symmetry Y-Y. The difference between the first and second angles $\alpha_1$ and $\alpha_2$ and between the third and fourth angles $\alpha_3$ and $\alpha_4$ is a maximum of 4° in order to allow the balls to be in permanent contact to the greatest possible extent with the four rolling tracks of the inner ring 3 and outer ring 2.

Figure 6:
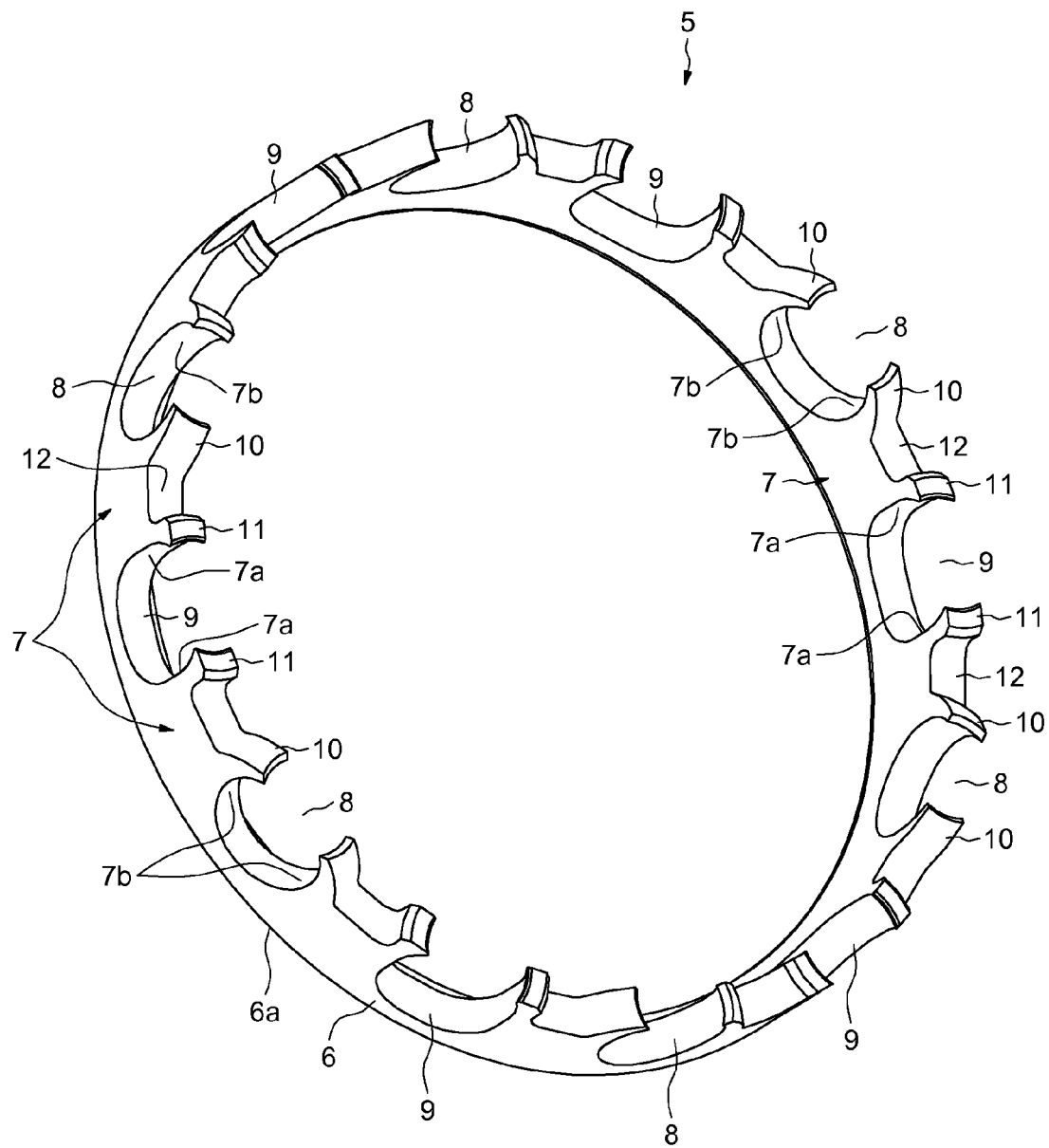
FIG. 6 is a perspective view of a cage of the rolling bearing of FIGS. 1 to 5.

As illustrated more clearly in FIG. 6, the cage 5 comprises an annular axial portion 6 which is provided to be axially arranged at one side of the balls and which forms an annular projection, and separation portions 7 or separation fingers which extend axially from the projection 6 at the opposite side to an outer radial face 6a of the projection. The separation portions 7 are monobloc with respect to the projection 6 and together delimit first and second pocket groups 8, 9, in which the balls are arranged. As will be described in greater detail below, each pocket 8, 9 is provided with means for axially retaining the cage 5 on the associated ball.

The pockets 8, 9 of the same group are identical to each other and different from the pockets of the other group. Each pocket 8 of the first group of pockets is separated from another pocket 8 of the group by a pocket 9 of the second group of pockets. The pockets 8, 9 are alternately distributed in the circumferential direction. A pocket 8 is separated from an adjacent pocket 9 by one of the separation portions 7. The pockets 8 of the first group and of the second group, respectively, are regularly distributed in the circumferential direction. The pockets 8 are provided with substantially spherical walls and the pockets 9 are provided with substantially cylindrical walls.

The separation portions 7 of the cage are in the form of fingers or pins which project axially relative to the projection 6. The separation portions 7 are radially delimited by an inner surface which is aligned with respect to the hole of the projection 6 and by an outer surface which is aligned with respect to the outer surface of the projection. Each separation portion 7 has at one side in the circumferential direction a cylindrical side wall 7a which is connected to the cylindrical wall 7a of the adjacent separation portion 7 in order to form one of the pockets 9 and has at the opposite side a spherical side wall 7b which is connected to the spherical wall 7b of the adjacent separation portion 7 in order to form one of the pockets 8. Each pocket 9 is delimited by two cylindrical side walls 7a which are spaced apart in the circumferential direction and which are connected by a wall having a planar base. Each pocket 8 is delimited by two spherical side walls 7b which are spaced apart in the circumferential direction and which are connected by a wall having a spherical base.

Each separation portion 7 comprises a first claw 10 which extends axially counter to the projection 6 and the free end of which extends in the circumferential direction in the direction of the claw 10 opposite the adjacent separation portion 7 in order to delimit the same pocket 8. The spherical walls of each pocket 8 tend to envelop the associated ball and are extended by the concave inner faces of the claws 10. The two claws 10 associated with a pocket 8 extend in the direction towards each other, the free ends thereof being spaced apart by a distance less than the diameter of the balls. The claws 10 of a pocket 8 are capable of ensuring the axial retention of the cage 5 by snap-fitting on the ball arranged in the pocket. The cage 5 is retained axially on the row of balls by the claws 10.

Each separation portion 7 also comprises a second claw 11 which extends axially counter to the projection 6 and circumferentially at the opposite side to the claw 10 of the portion. The free end of each claw 11 of a separation portion extends in the circumferential direction in the direction of the opposite claw 11 of the adjacent separation portion 7 in order to delimit the same pocket 9. The concave inner face of each claw 11 axially and circumferentially extends the cylindrical wall 7a of the associated pocket 9 at the side opposite the projection 6. The two claws 11 associated with a pocket 9 extend in the direction towards each other, the free ends thereof being spaced apart by a distance less than the diameter of the balls. The claws 11 of a pocket 9 are capable of ensuring the axial retention of the cage 5 by snap-fitting on the ball arranged in the pocket. The cage 5 is thus retained axially on the row of balls not only by the claws 10 but also by the claws 11. The claws 11 are different from the claws 10. Each of the pockets 8, 9 of the cage comprises means for axially retaining the cage 5 on the balls.

The first and second claws 10, 11 of each separation portion are separated in the circumferential direction by a recess 12 so that each claw 10, 11 has a relatively small circumferential thickness and a given flexibility which allows the cage 5 to be snap-fitted on the balls by moving the claws away circumferentially during axial pressure applied to the projection 6 of the cage in the direction of the balls. Each pocket 8, 9 is radially open inwards and outwards and also axially open at the opposite side to the projection 6 in order to allow the cage 5 to be positioned.

The diameter of the spherical walls 7b of the pockets 8 of the first group is greater than that of the balls 4 so that each pocket 8 has play with the associated ball 4. The play provided between each pocket 8 of the first group and the associated ball 4 is between 1% and 2.6% of the diameter of the ball, and preferably between 1.5% and 2.3% of the diameter. Preferably, the play provided between each pocket 8 and the ball 4 is 2% of the diameter of the ball. The diameter of the cylindrical walls 7b of the pockets 9 of the second group is greater than that of the balls 4 so that each pocket 9 has a play with the associated ball 4. The play provided between each pocket 9 of the second group and the associated ball 4 is between 2.7% and 5% of the diameter of the ball, and preferably between 3.05% and 4.2% of the diameter. Preferably, the play provided between each pocket 9 and the ball 4 is 3.4% of the diameter of the ball. The first range of plays provided between the spherical pockets 8 of the first group and the associated balls is strictly less than the second range of plays provided between the cylindrical pockets 9 of the second group and the associated balls.

The play provided between each pocket 8 and 9 and the associated ball 4, respectively, comprises an axial play $J_{8a}$ and two circumferential plays $J_{8c1}$ and $J_{8c2}$ (FIGS. 3 and 5), an axial play $J_{9a}$ and two circumferential plays $J_{9c1}$ and $J_{9c2}$ (FIGS. 2 and 4), respectively. The axial play $J_{8a}$ provided between each pocket 8 and the associated ball 4 is between 1% and 2.6% of the diameter of the ball, and is preferably 2% of the diameter. The total of the circumferential plays $J_{8c1}$ and $J_{8c2}$ provided between each pocket 8 and the associated ball 4 is between 1% and 2.6% of the diameter of the ball, and is preferably 2% of the diameter.

The axial play $J_{9a}$ provided between each pocket 9 and the associated ball 4 is between 2.7% and 5% of the diameter of the ball, and is preferably 3.4% of the diameter. The total of the circumferential plays $J_{9c1}$ and $J_{9c2}$ provided between each pocket 9 and the associated ball 4 is between 2.7% and 5% of the diameter of the ball, and is preferably 3.4% of the diameter. Each axial play $J_a$ corresponds to the minimum axial spacing which exists between an inner face 6b of the projection 6 and the ball 4 received in the corresponding pocket. The inner face 6b corresponds to the surface of the bottom wall of the pocket being considered which is orientated towards the ball. The opposing outer face 6a and inner face 6b axially delimit the projection 6. The circumferential plays $J_c$ correspond to the minimum circumferential spacing which exists between the cylindrical walls 7a or spherical walls 7b of the corresponding pocket 8, 9 and the ball 4 received in the pocket.

The cage 18 is advantageously produced in a single piece by moulding a polymer material such as, for example, polyamide, in particular PA 66 or PA 46, or a polyether ether ketone (PEEK).

With further reference to FIGS. 2 to 5, the rolling bearing 1 also comprises sealing joints 13, 14 which are arranged between the rings axially at one side and the other of the balls 4 in order to prevent the introduction of external polluting particles. In the embodiment illustrated, the sealing joints 13, 14 are fixed in grooves which are provided in the hole of the outer ring 2 and cooperate with the outer surface of the inner ring 3 in order to form seals by means of narrow passages.

Figure 7:
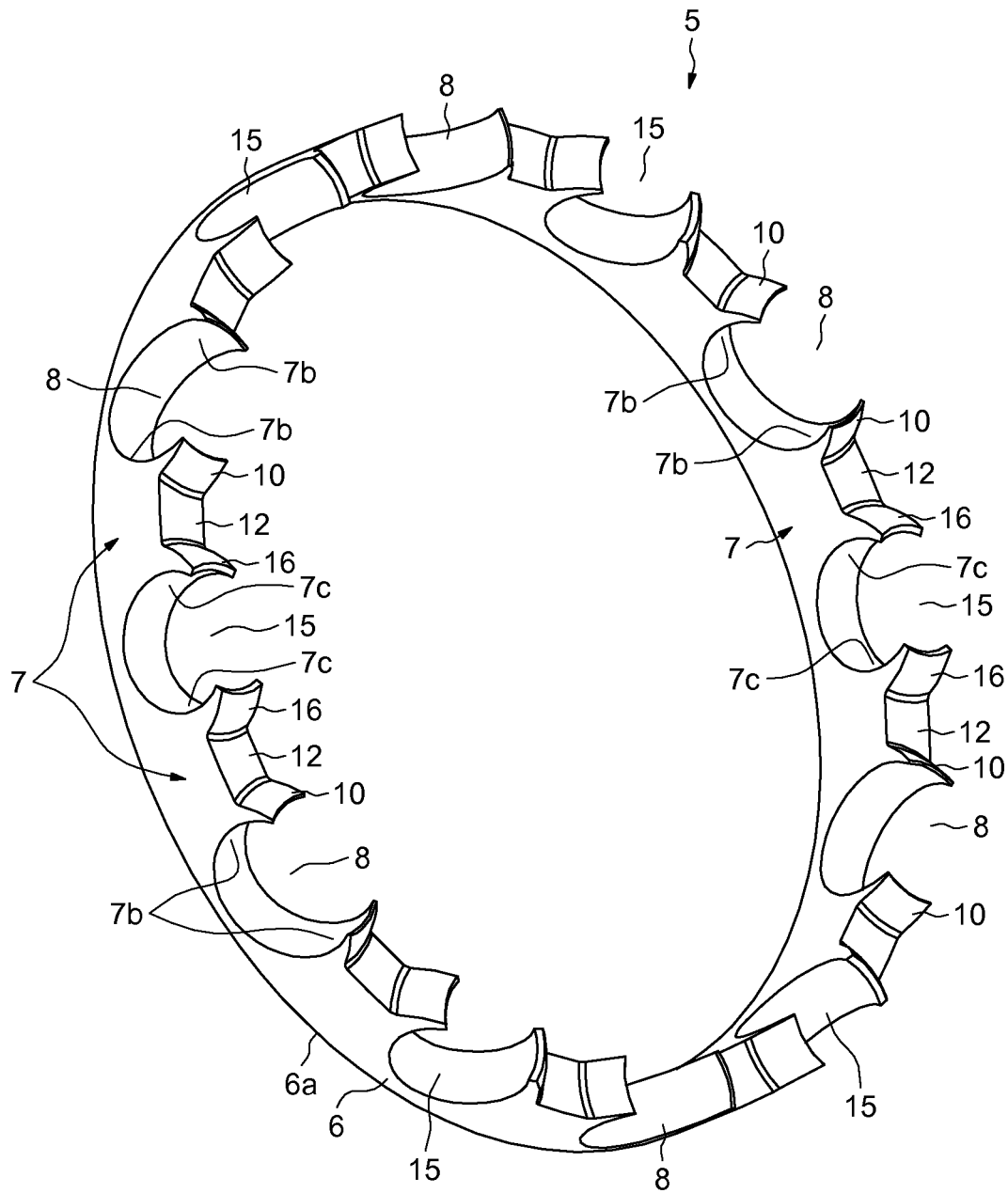
FIG. 7 is a perspective view of a cage of a rolling bearing according to a second embodiment of the invention.

The embodiment illustrated in FIG. 7 in which identical elements have the same reference numerals differs in that each separation portion 7 of the cage comprises, at the opposite side in the circumferential direction to the spherical wall 7b, a spherical wall 7c which is connected to the spherical wall 7c of the adjacent separation portion 7 in order to form a pocket 15. Each pocket 15 is delimited by two spherical side walls 7c which are spaced apart from each other in the circumferential direction and which are connected by a spherical bottom wall. The pockets 15 form a second group of pockets in relation to the first group formed by the pockets 8.

The relative arrangement of the pockets 8, 15 of the first and second groups is identical to that of the first embodiment.

Each separation portion 7 comprises a second claw 16 which extends axially counter to the projection 6 and circumferentially at the side opposite the claw 10 of the portion. The free end of each claw 16 of a separation portion extends in the circumferential direction in the direction of the opposite claw 16 of the adjacent separation portion 7 in order to delimit the same pocket 15. The concave inner face of each claw 16 axially and circumferentially extends the spherical wall 7c of the associated pocket 15 at the side opposite the projection 6. The two claws 16 associated with a pocket 15 extend in the direction towards each other, the free ends thereof being spaced apart by a distance less than the diameter of the balls. The claws 16 of a pocket 15 are capable of ensuring the axial retention of the cage 5 by snap-fitting on the ball arranged in the pocket. The claws 16 are identical to the claws 10. Each of the pockets 8, 15 of the cage comprises means for axially retaining the cage 5 on the balls. The first and second claws 10, 16 of each separation portion are separated in the circumferential direction by the recess 12.

In this embodiment, the pockets 8, 15 of the first and second groups are of identical form, the pockets of the same group having mutually identical dimensions. The dimensions of the pockets 15 are greater than those of the pockets 8. The play provided between each pocket 15 of the second group and the associated ball 4 is between 2.7% and 5% of the diameter of the ball, and is preferably 3.4% of the diameter. The play provided between each pocket 8 of the first group and the associated ball 4 remains unchanged in relation to the first embodiment described.

In another construction variant, it could further be possible to provide a cage comprising, in place of the spherical pockets 8, 15, cylindrical pockets which are each provided with means for axial retention and which have a relative arrangement of identical pockets and identical plays to those defined above.

In the embodiments illustrated, the cage is used in a rolling bearing which comprises outer and inner rings which are each provided with two rolling raceways so as to obtain a bearing having four contact locations. In a variant, it could be possible to use the cage with solid rings which each comprise a single rolling raceway, or with other types of rings, for example, having thin walls particularly produced by cutting and swaging a metal sheet or a tube of steel.

The provision of two different ranges of plays for one group of pockets and for the other group of pockets allows the contact zones between the cage and the balls to be limited. The interaction between the cage and the balls is reduced. Furthermore, the balls are movable relative to each other, which reduces the risk of inadvertent deformation in the event of opposing movements of two adjacent balls. The cage cannot be deformed to a great extent and has an increased service-life as a result of the slight friction between the cage and the balls. Furthermore, the arrangement of retention means for each pocket allows a good axial connection of the cage on the balls to be achieved.

The invention claimed is:

1. A cage for a rolling bearing for circumferential spacing a row of balls, each of the balls having the same diameter, the cage comprising:
   at least two groups of pockets for receiving the balls, a first group of the at least two groups of pockets comprising a plurality of spherical pockets, and a second group of the at least two groups of pockets comprising a plurality of cylindrical pockets;

an annular projection and adjacent separation portions extending from the annular projection that together delimit the pockets of the first and second groups, wherein the separation portions each comprise two claws each extending in a circumferential direction in a direction of one of the claws of an adjacent separation portion;

wherein a first range of axial play is provided between the pockets of the first group of the at least two groups and associated balls and a second range of axial play is provided between the pockets of the second group of the at least two groups and associated balls, and wherein the values of the first and second ranges of axial play are different from each other.

2. The cage according to claim 1, wherein the first range of axial play is between 1% and 2.6% of the diameter of the balls.

3. The cage according to claim 2, wherein the first range of axial play is between 1.5% and 2.3% of the diameter of the balls.

4. The cage according to claim 3, wherein the first range of axial play is 2% of the diameter of the balls.

5. The cage according to claim 1, wherein the second range of axial play is between 2.7% and 5% of the diameter of the balls.

6. The cage according to claim 5, wherein the second range of axial play is between 3.05% and 4.2% of the diameter of the balls.

7. The cage according to claim 6, wherein the second range of axial play is 3.4% of the diameter of the balls.

8. The cage according to claim 1, wherein the pockets of the first group are identical to each other.

9. The cage according to claim 1, wherein each pocket of the first group is separated from another pocket of the first group by a pocket of the second group.

10. The cage according to claim 1, wherein the first range of axial play is less than the second range of axial play.

11. A rolling bearing comprising:
an inner ring;
an outer ring;
at least one row of balls arranged between the inner and outer rings; and
a cage for circumferential spacing of the at least one row of balls, the cage comprising:
at least two groups of pockets for receiving the balls, a first group of the at least two groups of pockets comprising a plurality of spherical pockets, and a second group of the at least two groups of pockets comprising a plurality of cylindrical pockets; and
an annular projection and adjacent separation portions extending from the annular projection that together delimit the pockets of the first and second groups, wherein the separation portions each comprise two claws each extending in a circumferential direction in a direction of one of the claws of an adjacent separation portion;
wherein a first range of axial play is provided between the pockets of the first group of the at least two groups and associated balls and a second range of axial play is provided between the pockets of the second group of the at least two groups and associated balls, and
wherein the values of the first and second ranges of axial play are different from each other.

12. The rolling bearing according to claim 11, wherein the inner and outer rings each comprise two rolling raceways in order to form a four-point contact bearing.

13. The rolling bearing according to claim 11, wherein each pocket of the first group is separated from another pocket of the first group by a pocket of the second group.

14. The rolling bearing according to claim 11, wherein the first range of axial play is less than the second range of axial play.

\* \* \* \* \*